J. C. CLARK.
LAWN MOWER.
APPLICATION FILED APR. 4, 1914.

1,104,291. Patented July 21, 1914.

Witnesses
J. Milton Jester
C. Everett

Inventor
Joseph C. Clark
D. A. Gourick
Attorney

UNITED STATES PATENT OFFICE.

JOSEPH CHESTER CLARK, OF SAN ANGELO, TEXAS.

LAWN-MOWER.

1,104,291.  Specification of Letters Patent.  Patented July 21, 1914.

Application filed April 4, 1914. Serial No. 829,519.

*To all whom it may concern:*

Be it known that I, JOSEPH C. CLARK, a citizen of the United States, residing at San Angelo, in the county of Tom Green and State of Texas, have invented certain new and useful Improvements in Lawn-Mowers, of which the following is a specification.

My invention relates to rotary lawn mowers and more particularly to the stationary blades, and has for its object the provision of a novel form of stationary or lower blade which is so constructed that one of its ends will be engaged by the rotating blades before contacting with the main or body portion, and form a guide for the rotary blades whereby they may contact closely with the main or body portion of the stationary blade insuring an easy running, and a perfectly clean and smooth shearing of the grass, and prevent any shock, grinding or clicking when the contact is made.

Figure 1:
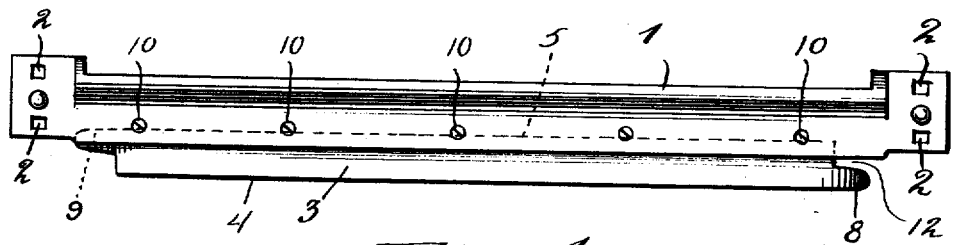
Figure 2:
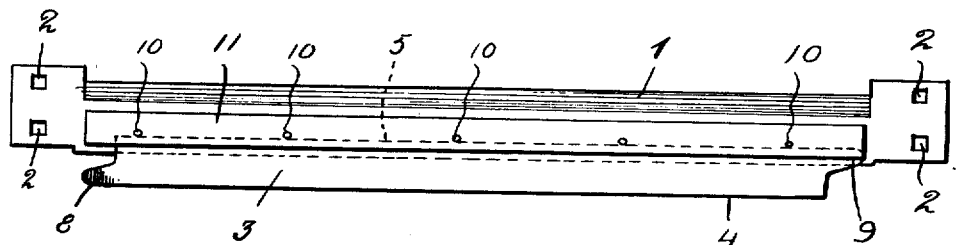
Figure 3:
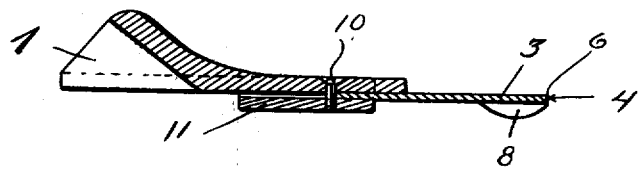
Figure 4:
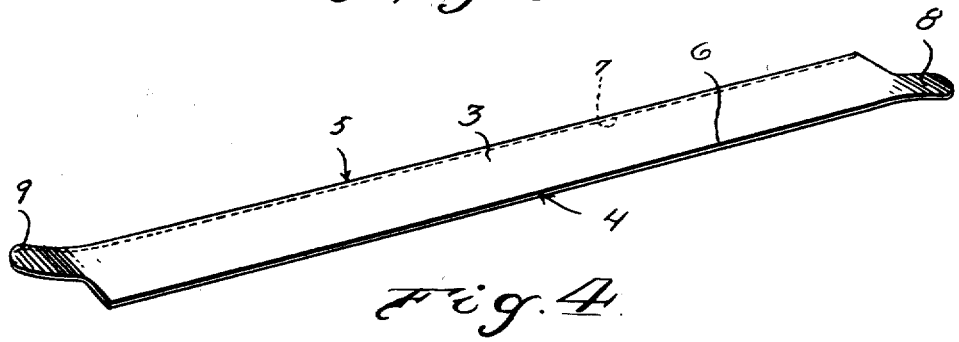

Other objects and advantages such as my improved means for clamping the blade upon the holder frame, simplicity, efficiency, freedom from clogging, etc., will be brought out in the following specification and illustrated in the accompanying drawings, in which:

Figure 1 is a plan view of a common lawn mower fixed blade holder to which my improved blade has been applied, Fig. 2 is a similar view of the bottom side thereof, Fig. 3 is a vertical cross sectional view, and Fig. 4 is a perspective view of the stationary blade detached.

Referring more particularly to the drawings, the numeral 1 designates the ordinary bar carrying the stationary blade in that type of lawn mower in which a plurality of spiral knives rotate and contact with a fixed blade for cutting grass. The bar 1 is provided with the usual openings 2 for the reception of the usual means for securing it to the body or frame of the mower. This bar 1 may vary in shape and size to some extent in various makes of mowers, but is always of a shape that will permit of my invention being applied thereto.

My improved blade comprises a main or body portion 3 formed of steel sufficiently thin to be somewhat yieldable. The longitudinal edges 4 and 5 of the blade are square and are exactly the same on both sides, thereby providing two cutting edges 6 and 7. At the ends of the body portion 3 the blade is provided with extensions or tongues 8 and 9 adjacent the front edge 4 and rear edge 5, respectively. The tongue 8 is curved downwardly and the tongue 9 upwardly, as shown most clearly in Fig. 4. Both of these tongues are integral with the body portion 3 of the blade and are easily formed by cutting away a portion of the material. It will also be observed that these tongues are parallel with and, in fact, in alinement with the longitudinal edges 4 and 5. By this construction it will be obvious that the blade has exactly the same shape and appearance whether in the position shown in the drawings or if it be turned around or inverted, and that I have thus provided a blade which is absolutely reversible.

I preferably provide means whereby the blade may be secured upon the bar 1 without having any holes in the blade though it will be readily understood that any other suitable fastening means could be used without detracting from the spirit of my invention. I prefer, however, to provide the bar 1 with a plurality of holes through which to pass the screws 10 which engage within the screw-threaded holes formed in the clamping plate 11 upon the lower side of the bar 1, and in practice I secure my improved blade upon the bar 1 by passing it between the bar 1 and the clamping plate 11 with one longitudinal edge contacting, or nearly so, with the screws 10, and then tightening the screws 10 until the blade is held firmly.

When my blade is attached as shown and described only one tongue, either the tongue 8 or 9, will extend beyond the forward longitudinal edge 4 or 5 of the blade, and by spacing the visible tongue from the forward edge of the bar 1 there is formed an opening as shown at 12. This opening permits dirt and trash to pass through instead of being scooped up and carried into the machine where it would cause wear and clogging of the parts.

It will be apparent that when in the operation of a mower equipped with my improved blade the spiral rotating blades contact with the curved tongue the yieldability of the blade will cause it to contact evenly, smoothly and snugly with the rotating blades, thus producing an ease of motion and certainty of cutting unobtainable in any other manner. It will also be apparent that my improved blade is reversible as both sides and edges are identical. Hence when one of the cutting edges, for instance the edge 6 on the longitudinal edge 4, becomes worn or dull, the blade may be reversed and the cutting edge 7 on the edge 5 used. By this construction of blade I provide a blade having twice the life of an ordinary blade.

Having thus described my invention what I claim is:

1. A stationary blade, for the purpose described, made of flexible material and having a tongue extending lengthwise from each end and parallel with the longitudinal edges of the blade.

2. In a lawn mower having a plurality of rotating knives, a stationary blade comprising a flat body portion and a downwardly curved tongue extending lengthwise from one end and adapted to be contacted with by said rotating knives.

3. In a lawn mower having rotating knives, a stationary blade comprising a thin flat body portion rectangular in cross section, and a downwardly curved tongue extending lengthwise thereof and parallel with the axis of said blade.

4. In a lawn mower having rotating knives, a stationary blade comprising a thin flat body portion rectangular in cross section, and a tongue extending lengthwise from each end and parallel with the longitudinal edges thereof formed thereon.

5. In a lawn mower having rotating knives, a stationary blade comprising a thin flat body portion rectangular in cross section, and curved tongues extending lengthwise from its end and parallel with the axis of said blade, one of said tongues being curved downwardly and the other curved upwardly.

6. In a lawn mower having rotating knives, a stationary blade comprising a thin, flat, yieldable body portion and a tongue formed on each end thereof, said tongue extending lengthwise from the ends of said blade and parallel with the longitudinal edges thereof, one tongue being curved downwardly and the other upwardly, one edge of said downwardly curved tongue being a continuation of the forward longitudinal edge and the corresponding edge of said other tongue being a continuation of the other longitudinal edge.

7. In a lawn mower having a frame, rotating knives mounted therein, and a transverse bar, a stationary blade comprising a thin strip of material provided with an upwardly curved tongue extending longitudinally from one end and a downwardly curved tongue extending longitudinally from the other end, a plate upon the lower side of said bar adapted to overlap said blade, and screws passing through said bar and said plate.

8. In a lawn mower having a frame, rotating knives mounted therein, and a transverse bar, a stationary blade comprising a thin strip of material, a tongue extending lengthwise from each of its ends, a plate upon the lower side of said bar adapted to overlap said blade and one of said tongues, and screws passing through said bar and said plate; the other of said tongues being on the free edge of said strip at its other end and curved downwardly.

9. In a lawn mower having rotary knives, a stationary blade comprising a thin, flat, yieldable body portion and a tongue formed on each end thereof; the tongue on one end being a longitudinal extension of one side of the blade and approximately one-half of its width and the tongue on the other end being a longitudinal extension of the opposite side of said blade and approximately one-half of its width.

In testimony whereof I hereto affix my signature in the presence of two witnesses.

JOSEPH CHESTER CLARK.

Witnesses:
J. A. THOMAS,
GUS JONES.

It is hereby certified that in Letters Patent No. 1,104,291, granted July 21, 1914, upon the application of Joseph Chester Clark, of San Angelo, Texas, for an improvement in "Lawn-Mowers," an error appears in the printed specification requiring correction as follows: Page 2, line 42, for the word "tongue" read *tongues;* and that the said Letters Patent should be read with this correction therein that the same may conform to the record of the case in the Patent Office.

Signed and sealed this 11th day of August A. D., 1914.

[SEAL.]

J. T. NEWTON,

*Acting Commissioner of Patents.*